(12) United States Patent
McMunn

(10) Patent No.: US 10,212,947 B2
(45) Date of Patent: Feb. 26, 2019

(54) CAKE MOLDING PROCESS AND APPARATUS

(71) Applicant: Cake Effects, LLC, Lake Wales, FL (US)

(72) Inventor: Kevin Ralph McMunn, Fort McMurray (CA)

(73) Assignee: Cake Effects, LLC, Lake Wales, FL (US)

( * ) Notice: Subject to any disclaimer, the term of this patent is extended or adjusted under 35 U.S.C. 154(b) by 341 days.

(21) Appl. No.: 14/419,274

(22) PCT Filed: May 6, 2013

(86) PCT No.: PCT/CA2013/000443
§ 371 (c)(1),
(2) Date: Feb. 3, 2015

(87) PCT Pub. No.: WO2014/026266
PCT Pub. Date: Feb. 20, 2014

(65) Prior Publication Data
US 2015/0181892 A1    Jul. 2, 2015

Related U.S. Application Data

(60) Provisional application No. 61/723,375, filed on Nov. 7, 2012, provisional application No. 61/683,254, filed on Aug. 15, 2012.

(51) Int. Cl.
*A21B 3/13* (2006.01)
*A21D 13/24* (2017.01)
(Continued)

(52) U.S. Cl.
CPC ............... *A21B 3/13* (2013.01); *A21B 3/132* (2013.01); *A21B 3/138* (2013.01); *A21D 13/24* (2017.01); *A21D 13/47* (2017.01); *A21D 13/80* (2017.01)

(58) Field of Classification Search
None
See application file for complete search history.

(56) References Cited

U.S. PATENT DOCUMENTS 3,503,345 A     3/1970  Abrams
3,537,866 A *  11/1970  Weller ................... A23G 9/286
                                                                    426/274
(Continued)

FOREIGN PATENT DOCUMENTS

FR    2692444 A1   12/1993
GB    2226225 A    6/1990
GB    2439715 A    1/2008

OTHER PUBLICATIONS

The Big Bake Theory. "Ganache 101". Feb. 24, 2012. http://bigbaketheory.com/2012/02/24/ganache-101/ (Year: 2012).*

(Continued)

*Primary Examiner* — Michele L Jacobson
*Assistant Examiner* — Stephanie A Cox
(74) *Attorney, Agent, or Firm* — Brinks Gilson & Lione

(57) ABSTRACT

A kit of parts for preparing a cake comprises a core mold for preparing a core of the cake, and a finishing mold for finishing the cake. The core mold has a core mold volume, and the finishing mold has a finishing mold volume greater than the core mold volume. The finishing mold is shaped to receive the core of the cake. In some examples, the finishing mold comprises a rigid support layer comprising an inner surface, and a flexible lining layer comprising an outer surface. The lining layer may be removably receivable within the support layer such that the outer surface of the lining layer faces and contacts the inner surface of the support layer.

9 Claims, 12 Drawing Sheets

(51) Int. Cl.
   *A21D 13/47*    (2017.01)
   *A21D 13/80*    (2017.01)

(56) References Cited

U.S. PATENT DOCUMENTS

| | | |
|---|---|---|
| 5,499,914 A | 3/1996 | Rist |
| 7,303,712 B2 | 12/2007 | Kitamura et al. |
| 7,314,590 B2 | 1/2008 | Yaeger |
| 2004/0076727 A1 | 4/2004 | L'Hommedieu |
| 2005/0031752 A1 | 2/2005 | Koplish |
| 2008/0254172 A1 | 10/2008 | Woodhouse et al. |
| 2010/0080871 A1 | 4/2010 | Doty |

OTHER PUBLICATIONS

NPL-1-Salessa Icing Tips Website identified as www.salessa.co.za/index.php?option=com_content&view=article&id=21&Itemid=86 entitled "Mold Inspection & Testing" dated Jun. 28, 2012.
NPL-2 website—www.makeit-loveit.com/2010/05/baking-stacking-and-icing.html.
NPL-3 website—ca.answers.yahoo.com/question/index?qid=20070616062514AA0wdlz.

* cited by examiner

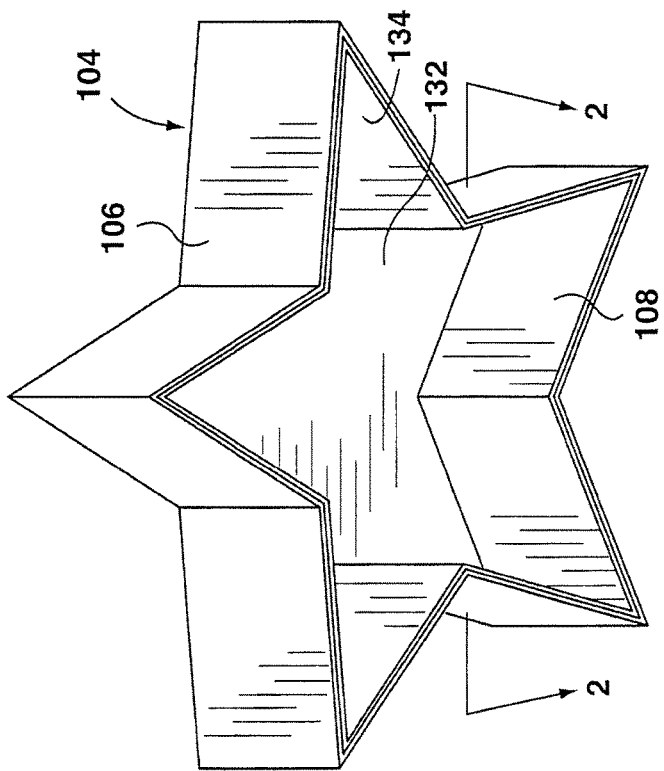
FIG. 1
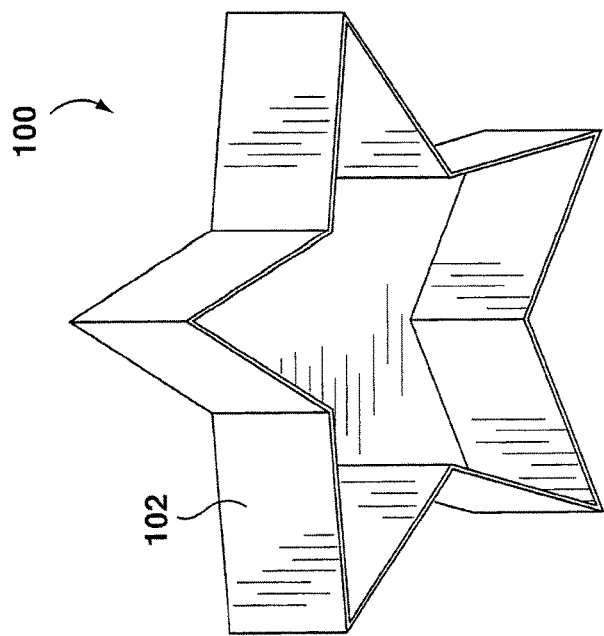
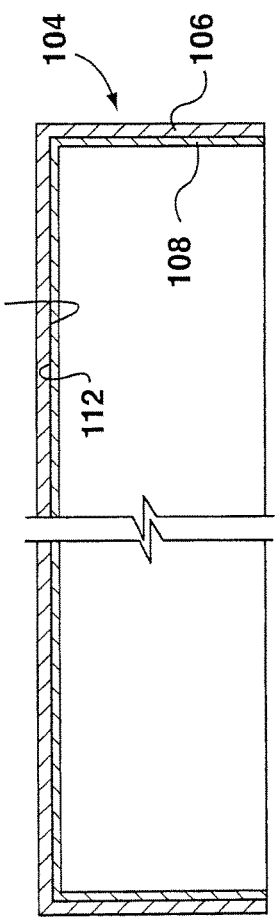
FIG. 2

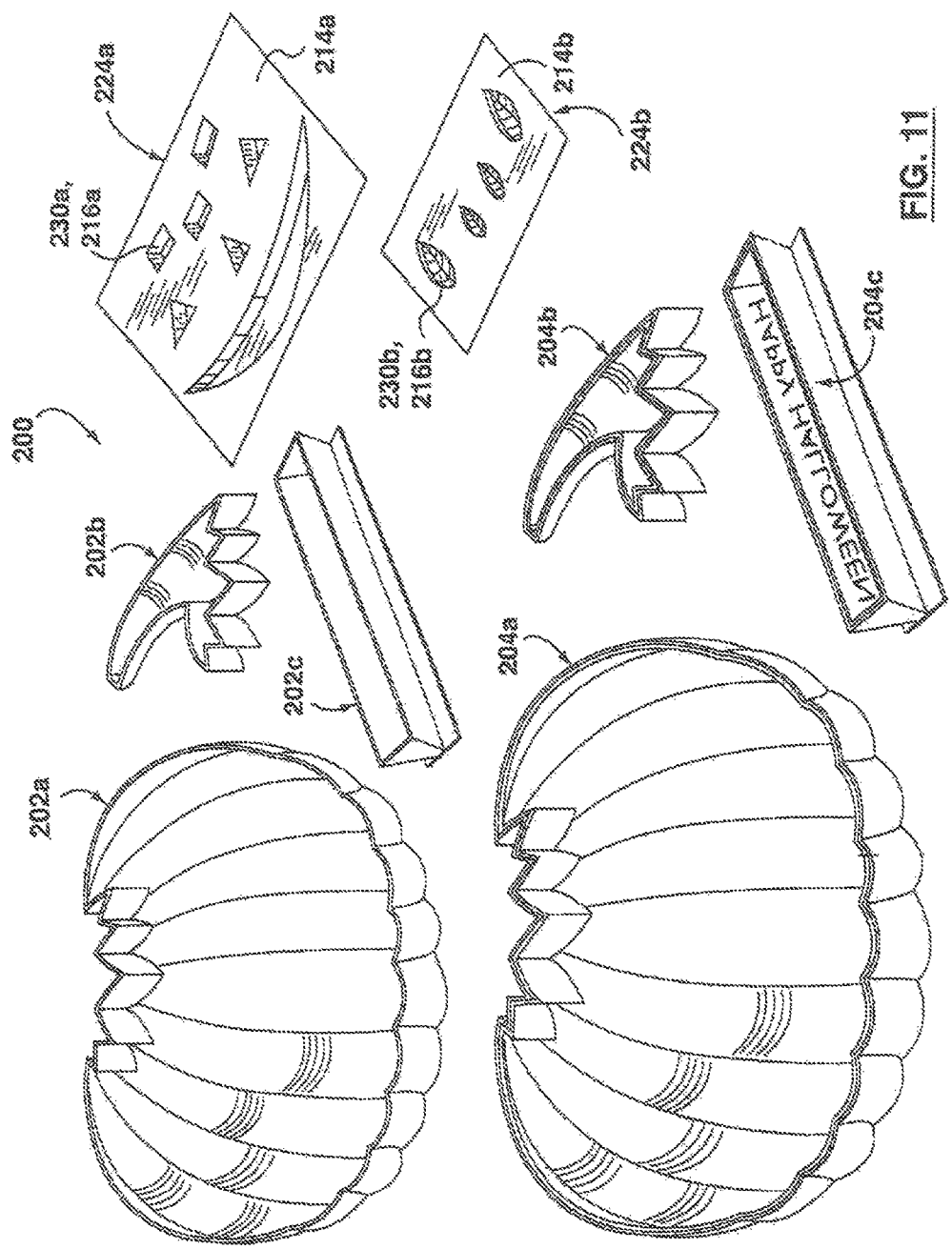

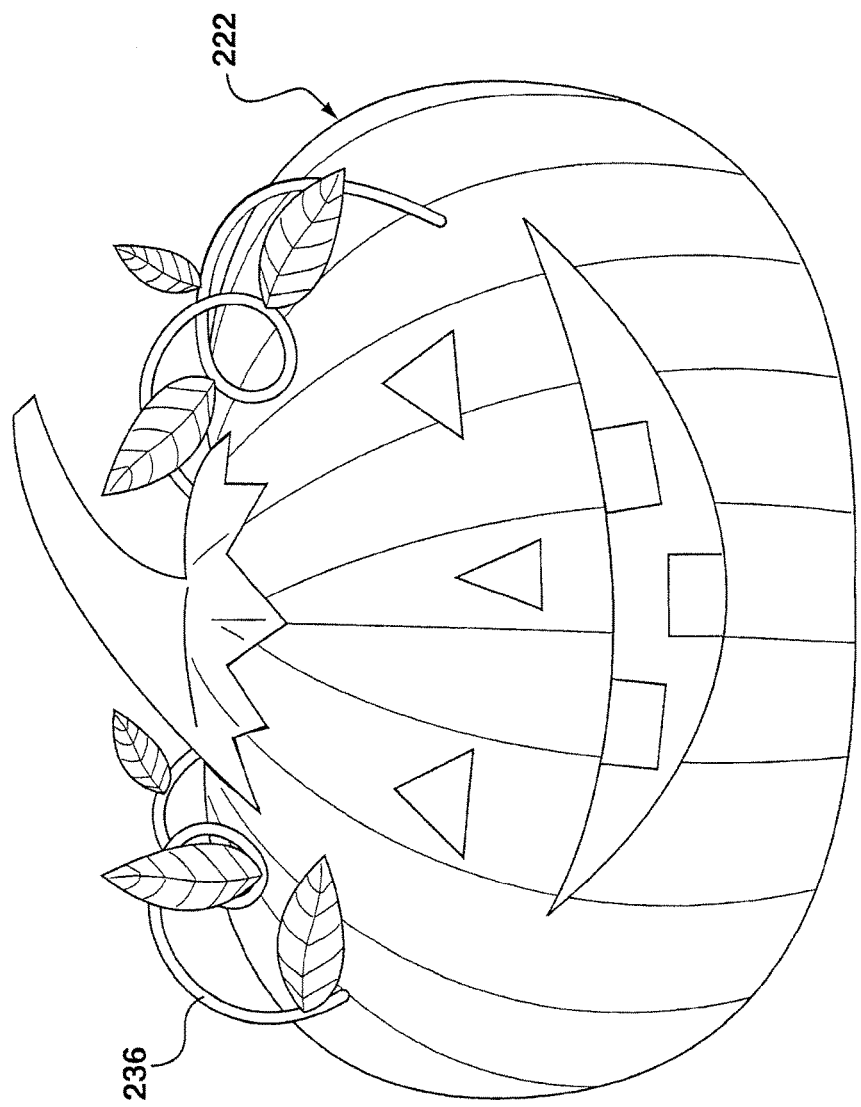

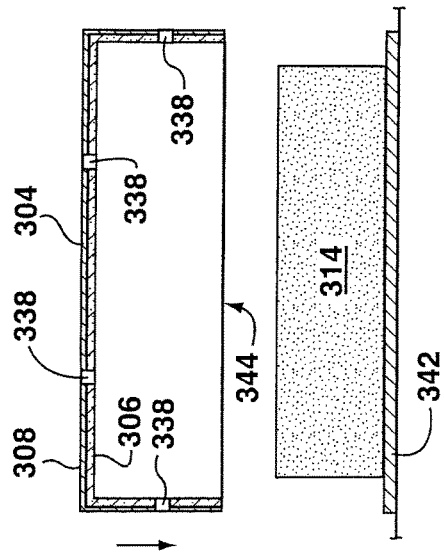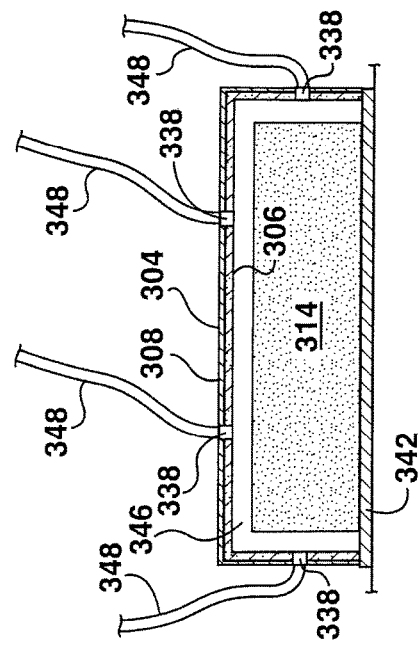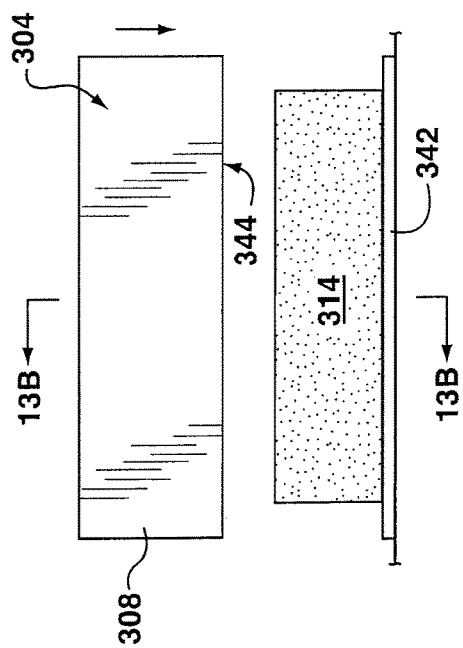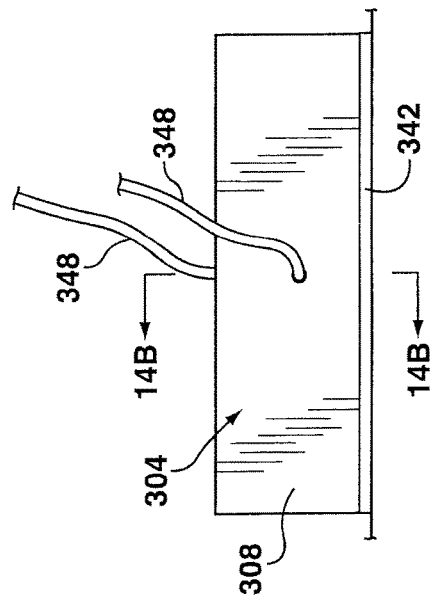
FIG. 13A
FIG. 13B
FIG. 14A
FIG. 14B

CAKE MOLDING PROCESS AND APPARATUS

CROSS-REFERENCE TO RELATED APPLICATIONS

This application is a national phase entry application of PCT Patent Application No. PCT/CA2013/000443, filed May 6, 2013, which claims priority from U.S. Provisional Patent Application No. 61/683,254, filed Aug. 15, 2012, and U.S. Provisional Patent Application No. 61/723,375 filed Nov. 7, 2012, both of which are hereby incorporated by reference in their entirety.

FIELD

The disclosure relates to a process and apparatus for molding cakes. More specifically, the disclosure relates to a process and apparatus for molding a finished cake, including a cake core such as a flour-based baked product, and a layer of finishing compound such as icing.

BACKGROUND

U.S. Pat. No. 3,503,345 (Abrams) purports to disclose a method for decorating a cake by pre-forming a disk of icing, freezing the disk so that it hardens to facilitate handling, and then placing the disk on the cake so that it softens to form the top of the cake.

U.S. Patent Application Publication No. 2004/0076727 (L'Hommedieu) purports to disclose a method and system for making ice cream novelties and cakes, including selecting a mold comprised of a flexible, elastomeric, silicone-based material (preferably a combination of GE 6035 and GE 6075), obtaining ice cream in a temperature range between 0° F. to 20° F., folding the ice cream into the selected mold to create a molded material, adding layers or filling if desired, allowing the molded material to harden at a time and temperature sufficient to permit minimal to optimal hardness for demolding without sacrifice of integrity of the molded material, and demolding the molded material from the mold. The mold combination is 25% and 75% of GE 6035 and GE 6075, respectively. Where the selected mold is an ice cream pop mold of a size 8 cm by 4.7 cm by 2.5 cm, the minimal unmolding occurs at −10° F. at 52 minutes and optimal unmolding occurs at −14° F. at one hour. Where the selected mold is a deep small cake mold 20 cm round by 4.5 cm deep, the minimal unmolding occurs at 0° F. at one hour and twenty-two minutes and optimal unmolding occurs at −5° F. at one hour and forty five minutes. Where the selected mold is a deep large cake mold 24 cm round by 5.7 cm deep, the minimal unmolding occurs at 0° F. at two hours and twenty two minutes and optimal unmolding occurs at −5° F. at two hours and forty five minutes.

U.S. Patent Application Publication No. 2008/0254172 (Woodhouse et al.) purports to disclose a method for applying a color image to a non-planar comestible. The method may include applying a color image onto a substantially planar carrier and deforming the carrier to form a non-planar relief mold of a three-dimensional image. The method may include deforming the color image whereby the deformed color image is proportionate relative to, i.e., is in register with, the three-dimensional image. A comestible material, e.g., chocolate or a gelatinous edible composition, may be deposited into the relief mold to substantially overlie the color image. The comestible material may be removed from the relief mold, with the color image applied thereto. In one implementation, the color image may be applied to the substantially planar carrier by screen printing one or more colors forming the color image onto the carrier using an edible ink composition.

SUMMARY

The following summary is intended to introduce the reader to various aspects of the applicant's teaching, but not to define any invention.

According to one aspect, a kit of parts for preparing a cake comprises a core mold for preparing a core of the cake, and a finishing mold for finishing the cake. The core mold has a core mold volume, and the finishing mold has a finishing mold volume greater than the core mold volume. The finishing mold is shaped to receive the core of the cake.

In some examples, the finishing mold comprises a rigid support layer comprising an inner surface, and a flexible lining layer comprising an outer surface. The lining layer may be removably receivable within the support layer such that the outer surface of the lining layer faces and contacts the inner surface of the support layer.

In some examples, the lining layer may be fabricated from food-grade silicone. The lining layer may have a wall thickness of between about 0.10 inches and 0.15 inches.

In some examples, the support layer comprises a plurality of sections. The sections may be disassemblable from each other and assemblable together.

In some examples, the finishing mold volume may be between about 15% and 25% greater than the core mold volume, and more specifically, between about 18% and 22% greater than the core mold volume.

In some examples, the kit of parts further comprises a decoration accessory. The decoration accessory may comprise a decorative feature formed therein, and the decorative feature may be impartable to the cake. The decoration accessory may be an insert receivable within the finishing mold.

In some examples, the finishing mold may comprise at least one injection port extending therethrough.

In some examples, the finishing mold comprises an opening through which the core of the cake is received. The kit of parts may further comprise a seal for sealing the opening when the cake is received in the finishing mold.

According to another aspect, a finishing mold for finishing a cake comprises a rigid support layer comprising an inner surface, and a flexible lining layer comprising an outer surface. The lining layer may be removably receivable within the support layer such that the outer surface of the lining layer faces and contacts the inner surface of the support layer.

In some examples, the lining layer may be fabricated from food-grade silicone. The lining layer may have a wall thickness of between about 0.10 inches and about 0.15 inches.

In some examples, the support layer may comprise a plurality of sections, and the sections may be disassemblable from each other and assemblable together.

In some examples, the finishing mold may comprise at least one injection port extending through the support layer and the lining layer.

According to another aspect, a method for preparing a cake comprises a) applying a finishing compound to a finishing mold, b) inserting a cake core into the finishing mold and pressing the cake core into the finishing compound, c) hardening the finishing compound, and d) removing the finishing mold from the cake core and finishing compound.

In some examples, step c) may comprise cooling the finishing compound, for example by freezing the finishing compound.

In some examples, prior to step b), the method may comprise hardening the cake core. Hardening the cake core may comprise cooling the cake core, for example by freezing the cake core.

In some examples, the finishing mold may comprise a rigid support layer and a flexible lining layer, and step d) may comprise i) removing the support layer from the lining layer; and ii) peeling the lining layer off of the finishing compound.

In some examples, step i) may comprise disassembling the support layer.

According to another aspect, a method for preparing a cake comprises a) inserting a cake core into a finishing mold; b) applying a finishing compound to the finishing mold; c) hardening the finishing compound; and d) removing the finishing mold from the cake core and finishing compound.

In some examples, after step a) and before step b), the method may further comprise sealing an opening of the finishing mold.

In some examples, step b) may comprise applying the finishing compound to a void between the cake core and the finishing mold.

In some examples, step b) may comprise injecting the finishing compound through at least one injection port of the finishing mold.

In some examples, the method may further comprise applying a force to the finishing mold to move the finishing compound within the finishing mold.

In some examples, after step b) and before step c), the method further may further comprise hardening the finishing compound.

In some examples, step b) may take place before step a). In some further examples, before step a) and after step b), the method may further comprise hardening the finishing compound.

According to another aspect, a method for preparing a cake comprises a) preparing a first cake core in a first core mold; b) removing the first cake core from the first core mold; c) applying a finishing compound to the first core mold; d) inserting the first cake core into the first core mold; and e) removing the first core mold from the first cake core and finishing compound.

In some examples, step a) may comprise baking the first cake core in the first core mold.

In some examples, step a) may comprise baking the first cake core to occupy between 50% to 75% of a volume of the first core mold.

In some examples, after step b) and before step d), the method may further comprise trimming a perimeter of the first core mold.

In some examples, after steps c) and d) and before step e), the method may further comprise applying a transitional layer of finishing compound between the first cake core and the finishing compound applied at c).

In some examples, the method may further comprise f) repeating steps a) to e) using a second core mold to prepare and finish a second cake core; and g) stacking the first and second cake cores.

In some examples, the method may further comprise applying finishing compound to the stacked first and second cake cores.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 1 is a perspective view of a kit of parts for preparing a cake;

FIG. 2 is a cross-sectional view taken along line 2-2 in FIG. 1;

FIG. 11 is a perspective view of an alternate kit of parts for preparing a cake;

FIG. 12 is a top plan view of a cake prepared with the kit of FIG. 11;

FIG. 13A is a front plan view of a cake core being inserted into an alternate finishing mold;

FIG. 13B is a cross-sectional view taken along line 13B-13B in FIG. 13A;

FIG. 14A is a front plan view of the finishing mold of FIG. 13A, with the cake core inserted therein, and showing the finishing mold sealed by a seal, and having conduits connected thereto; and FIG. 14B is a cross-sectional view taken along line 14B-14B in FIG. 14A.

DETAILED DESCRIPTION

Figure 3:
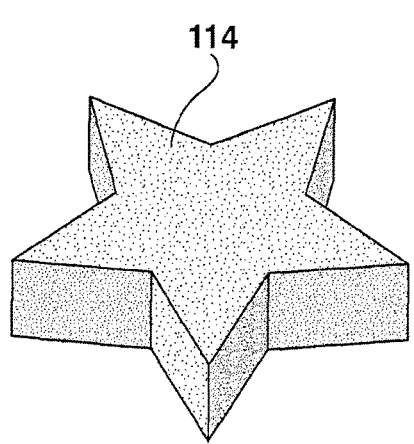
FIG. 3 is a perspective view of a cake core prepared with the kit of FIG. 1.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any invention disclosed in an apparatus or process described below and for which an exclusive right is not granted by issuance of this patent application may be the subject matter of another protective instrument, for example, a continuing patent application, and the applicants, inventors or owners do not intend to abandon, disclaim or dedicate to the public any such invention by its disclosure in this document.

Referring to FIG. 1, an exemplary kit of parts 100 for preparing a cake is shown. The kit of parts includes a core mold 102, and a finishing mold 104. The core mold 102 may be used for preparing the core of the cake. For example, the core mold may be a cake pan that is made from aluminum, cast iron, stainless steel, non-stick coated metal, or high temperature food-grade silicon, and may be used for preparing a cake core such as a flour-based baked product. In the example illustrated, the core mold 102 is a generally star-shaped cake pan which may be used in accordance with known methods to bake a generally star-shaped cake core.

Referring still to FIG. 1, the finishing mold 104 may be used for finishing the cake, for example for applying a finishing compound such as icing to the cake, as will be described in further detail below. In the example shown, the finishing mold 104 has a volume (also referred to as a "finishing mold volume") that is greater than the volume of the core mold 102 (also referred to as a "core mold volume"), and is generally shaped to receive the cake core. For example, as shown, both the finishing mold 104 and the core mold 102 are star-shaped, and the finishing mold 104 has a volume that is between about 15% and 25% greater than the volume of the core mold 102, and more specifically between about 18% and 22% greater than the volume of the core mold 102. In one particular example, the volume of the finishing mold 104 may be about 20% greater than the volume of the core mold 102. This can allow for a cake produced with the kit 100 to have a volume of icing that is about 20% of the volume of the cake core.

In other examples, both the core mold and the finishing mold may be other shapes. For example, both the finishing mold and the core mold may be round, square, rectangular, or a more complicated shape. In further alternate examples, the core mold and the finishing mold may be of a different shape from each other.

Referring to FIGS. 1 and 2, in the example shown, the finishing mold 104 includes a support layer 106 and a lining layer 108. The support layer 106 is generally stiff and rigid. For example, the support layer 106 may be made from aluminum, steel, steel coated with a non-stick compound, or suitably thick food-grade silicon. The lining layer 108 is generally flexible. For example, the lining layer 108 may be made from food-grade silicon having a wall thickness of between about 0.10 inches and 0.15 inches. In other examples, the lining layer may be of another thickness.

Referring to FIG. 2, the lining layer 108 is receivable and nestable in the support layer 106, so that the outer surface 110 of the lining layer 108 generally faces and contacts the inner surface 112 of the support layer 106.

Figure 4:
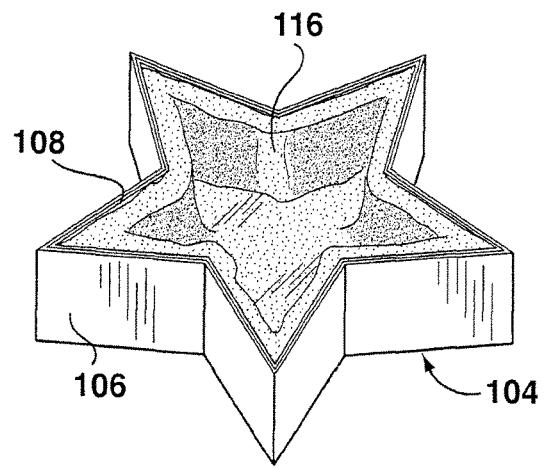
FIG. 4 is a perspective view of the finishing mold of FIG. 1, filled with finishing compound.
Figure 5:
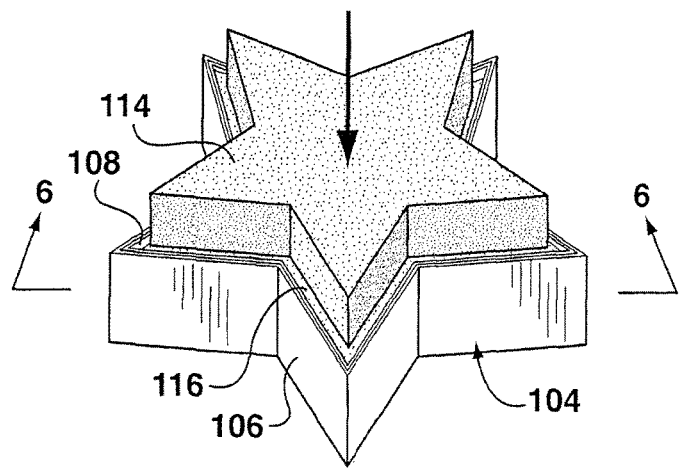
FIG. 5 is a perspective view of the cake core of FIG. 3 being inserted into the finishing mold of FIG. 4.
Figure 6:
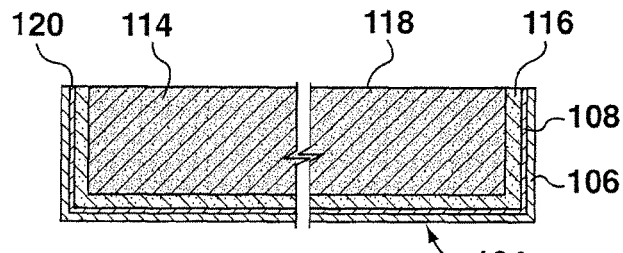
FIG. 6 is a cross section taken along line 6-6 in FIG. 5, with the cake fully inserted into the finishing mold.
Figure 7:
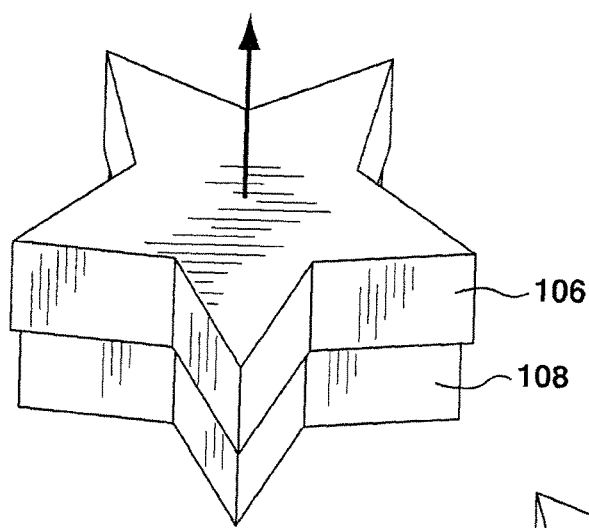
FIG. 7 is a perspective view showing the support layer of the finishing mold of FIG. 5 being removed from the lining layer.
Figure 8:
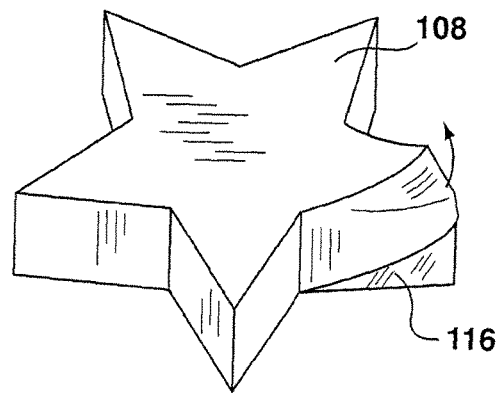
FIG. 8 is a perspective view showing the lining layer of FIG. 7 being removed from the cake.
Figure 9:
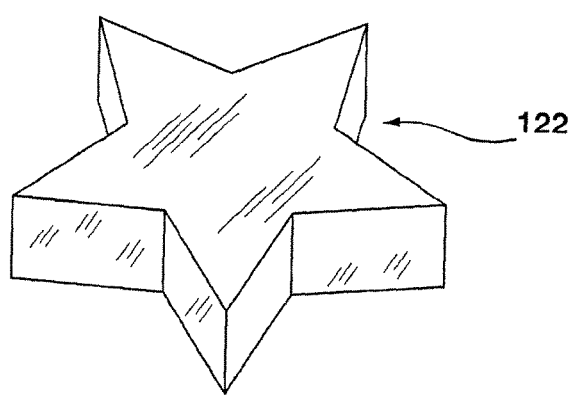
FIG. 9 is a perspective view of the finished cake produced by the kit of FIG. 1.

Referring to FIGS. 3 to 9, an exemplary series of steps for preparing a cake with the kit 100 of FIG. 1 is shown. Referring first to FIG. 3, the core mold 102 (shown in FIG. 1) may be used to prepare a cake core 114. For example, the cake core 114 may be flour-based, and may be baked in the core mold 102. The cake core 114 may then be removed from the core mold 102 and may optionally be hardened, for example by cooling or freezing the cake core 114. Referring to FIG. 4, a finishing compound 116 may be applied to the finishing mold 104, and more specifically, to the lining layer 108 of the finishing mold 104. The finishing compound 116 may be, for example, an icing or frosting. In some particular examples, the finishing compound 116 may be a putty icing. The putty icing may be a generally thick icing that is prepared similarly to a buttercream icing, but that is kneaded instead of whipped, such that it contains less air and is less fluffy. In some embodiments, the finishing compound 116 includes edible clay or gum paste. Other examples of finishing compounds are described below. An excess of the finishing compound 116 may be applied to the lining layer 108 (e.g. a volume that is more than 20% of the volume of the cake core 114), and may be spread about the lining layer 108. The lining layer 108 may be tapped to remove air between the finishing compound 116 and the lining layer 108. Referring to FIGS. 5 and 6, the hardened cake core 114 may be inserted into the finishing mold 104 and pressed into the finishing compound 116, so that the bottom surface 118 of the cake core 114 is generally flush with the bottom edge 120 of the finishing mold 104. Any excess finishing compound 116 that is pressed out of the finishing mold 104 may be scraped away. The finishing compound 116 may then optionally be hardened. For example, the finishing mold 104, containing the finishing compound 116 and the cake core 114, may be cooled or frozen. The finishing mold 104 may then be removed from the cake. Referring to FIG. 7, in order to remove the finishing mold 104, the support layer 106 may first be removed from the lining layer 108, for example by lifting it off of the lining layer 108. Referring to FIG. 8, the lining layer 108 may then be peeled off of the hardened finishing compound 116, to yield a finished cake 122, as shown in FIG. 9.

Figure 10:
FIG. 10 is a perspective view of a decoration accessory useable with the kit of FIG. 1.

Referring now to FIG. 10, the kit 100 may optionally include one or more decoration accessories 124. In the example shown, the decoration accessory 124 is an insert which includes a generally flat thin sheet 126 having a decorative feature 128 formed therein. The decorative feature 128 includes a mold 130 for text stating "Happy Birthday". The sheet 126 is shaped and sized to match the base 132 of the inner surface 134 of the finishing mold (shown in FIG. 1), which in the example shown is star-shaped. In use, a finishing compound, such as an icing of a different color than the icing used to finish the remainder of the cake, may be spread onto the sheet 126, so that it fills the mold 130 for the text. The excess icing may then be scraped away, so that the mold 130 for the text remains filled with icing, but the remainder of the sheet 126 is generally free of icing. Prior to applying the finishing compound 116 to the finishing mold 104 (i.e. prior to the step shown in FIG. 4), the insert may be inserted into the finishing mold 104, so that it rests on the base 132 of the inner surface 134 of the finishing mold 104. The method may then proceed through the steps shown in FIGS. 4 to 8. After the lining layer 108 is peeled away, the insert may be peeled off of the cake, imparting the text "Happy Birthday" to the top of the cake in icing.

In alternate examples, inserts may include alternate decorative features, and may be shaped and sized to be used on another part of the cake, such as on the side wall of the cake, rather than on the top.

In further alternate examples, decorative features may be formed directly in the lining layer of the finishing mold.

In a further alternate example, the finishing compound may be applied to the finishing mold, and then may be hardened before it is applied to the cake core. A generally soft transition layer of finishing compound (e.g. a room temperature icing) may then be applied to the cake core and/or the hardened finishing compound. The cake core may then be inserted into the finishing mold, so that the cake core, transition layer, and hardened finishing compound are pressed together, with the transition layer acting to adhere the cake core and finishing compound together. The finishing mold may then be removed from the cake core, transition layer, and hardened finishing compound.

As mentioned above, kits as described herein may be used to form finished cakes of relatively complicated shapes. An exemplary kit 200 useable to form a cake of a complicated shape is shown in FIGS. 11 to 12. In FIGS. 11 to 12, similar features to FIGS. 1 to 10 are labeled with similar reference numerals to FIGS. 1 to 10, incremented by 100. In the example of FIGS. 11 and 12, the kit 200 is useable to form a pumpkin-shaped cake 222 (shown in FIG. 12). Referring to FIG. 11, the kit 200 includes three sets of core molds 202a, 202b, 202c, and three corresponding finishing molds 204a, 204b, and 204c. The first core mold 202a and first finishing mold 204a are useable to form the main part of the pumpkin. The second core mold 202b and second finishing mold 204b are useable to form the stem of the pumpkin. The third core mold 202c and third finishing mold 204c are useable to form a plaque stating "Happy Halloween". Each core mold 202a-c and corresponding finishing mold 204a-c may be used as described above with respect to FIGS. 3 to 9 to respectively form a finished pumpkin body, a finished pumpkin stem, and a finished plaque, which may be assembled together to form a pumpkin-shaped cake 222 (shown in FIG. 12).

Referring to FIG. 11, the kit 200 further includes two decoration accessories 224a, 224b. The decoration accessories 224a, 224b are similar to the decoration accessory 124 described above, and each includes a generally flat thin sheet 214a, 214b, respectively, having decorative features 216a, 216b, respectively, formed therein. The first decoration accessory 224a includes a mold 230a for leaves of the pumpkin. The second decoration accessory 224b includes a mold 230b for the facial features of the pumpkin. In this example, rather than being used as an insert in the finishing mold 204, the decoration accessories 224a, 224b are useable to form decorative features which may be applied to the cake after the cake is removed from the finishing mold 204. For example, icing may be spread onto the sheets 214a, 214b such that it fills the molds 230a, 230b. The excess icing may then be scraped away, so that the molds 230a, 230b remain filled with icing, but the remainder of the sheets 214a, 214b are generally free of icing. The icing may then be hardened, for example by cooling or freezing the sheets 214a, 214b. When the icing has hardened, the decorative features may be removed from the molds 230a, 230b, and applied to the cake.

In the example shown, the finished cake 222 also includes decorative vines 236, which may be added to the finished cake with the use of a piping bag.

In alternate examples, rather than using a mold to form decorative features, decorative features may be formed, for example, by manually cutting features from a pre-formed sheet of icing.

Referring now to FIGS. 13A to 14B, another example series of steps for preparing a cake is shown. In FIGS. 13A to 14B, an alternate example of a finishing mold 304 is shown, and similar features to FIGS. 1 to 10 are identified with like reference numerals incremented by 200.

Referring to FIGS. 13A and 13B, in the example shown, the finishing mold 304 includes injection ports 338 extending therethrough. The injection ports 338 extend through the finishing layer 308 and the support layer 306. A finishing compound may be injected through the injection ports 338, as will be described below.

Referring to FIGS. 13A and 13B, in use a cake core 314 may be prepared (for example with a core mold as described above), and may be placed on a seal 342. The seal 342 may be a generally planar member that is sized to cover and seal the opening 344 of the finishing mold. The cake core may then be inserted into the finishing mold 304, for example by placing the finishing mold 304 over the cake core 314, so that the cake core 314 is received in the finishing mold 304 and so that the finishing mold 304 rests on the seal 342. The finishing mold 304 and the seal 342 may then be engaged so that they are generally sealed together. For example, pressure may be applied to the finishing mold 304 to force it downwardly onto the seal 342. Alternatively, one or more locks may be provided for securing the finishing mold 304 to the seal 342. Alternatively, a vacuum may be used to force the finishing mold 304 and the seal 342 together.

Referring to FIGS. 14A and 14B, a finishing compound may then be applied to the finishing mold 304. For example, a finishing compound may be injected into the injection ports 338, so that it is applied to the void 346 between the cake core 314 and the finishing mold 304. In the example shown, a conduit 348 is connected to each injection port 338, and finishing compound is injected into each injection port via the conduits 348. The conduits 348 may be rigid or flexible. One or more vents (not shown) may be provided for allowing air to exit the finishing mold 304 as finishing compound is injected.

In some examples, after the finishing compound has been applied, it may be hardened, and the seal may then be released, and the finishing mold 304 may be removed from the cake core 314 and finishing compound, as described above. In other examples, the support layer may be removed from the lining layer before the finishing compounds has been hardened.

In alternate examples (not shown), a seal may not be used. For example, the finishing mold may completely enclose the cake core, and may be openable to allow the cake core to be inserted therein.

The steps shown with regards to FIGS. 13A to 14B may be carried out automatically, for example in an industrial setting, or manually.

In the example shown, the conduits 348 are connected to and stop at the injection ports 338. In other examples (not shown), the conduits may pass through the injection ports 338 and into the void 346, so that finishing compound may be injected directly within the void 346. The conduits 348 may be shaped (e.g. bent, curved, and/or straight) so that they reach into various places in the void. The conduits may optionally be retracted as the finishing compound is injected. The retraction of the conduits may be automated, for example as a response to pressure or timing. Alternatively, the retraction of the conduits may be done manually.

In any of the examples described above, more than one layer of finishing compound may be applied to the finishing mold. For example, two layers of finishing compound may be applied to the finishing mold. In some particular examples, the composition of the outer layer of finishing compound (i.e. the layer that contacts the finishing mold) may be selected so that it readily fills any voids or conforms to any features of the finishing mold, so that decorative details of the finishing mold are shown with clarity. Such a finishing compound may be referred to as a liquid icing, and is described below. The inner layer may optionally be of another composition, for example a composition that is chosen for flavor.

Further, in any of the above examples, different finishing compounds may be applied at different locations within the finishing mold. For example, an icing of a first color may be injected into the void at a first location, and an icing of a second color may be injected into the void at a second location.

In any of the above examples, prior to the removal of the finishing mold, forces may be applied to the finishing mold to move the finishing compound within the finishing mold. For example, the forces may be applied to urge the finishing compound into any spaces or to urge the finishing compound to conform to any features of the finishing mold. In some examples, the forces may be applied by vibrating the finishing mold. For example, the finishing mold, containing the finishing compound and cake core, may be placed on a vibration table. In other examples, blunt forces may be used. For example, the finishing mold, containing the finishing compound and cake core, may be tapped or hit, or the table upon which the finishing mold rests may be tapped or hit. In other examples, the finishing mold, containing the finishing compound and cake core, may be spun.

In the examples described above, the support layer of each finishing mold is of a one-piece construction, and may be removed from the lining layer by lifting it off of the lining layer. In alternate examples, the support layer may include a plurality of separate sections, which are assemblable together to form the support layer, and which are disassemblable from each other to remove the support layer from the finishing layer. For example, the sections may snap together. Such a support layer may be useful in kits which form cakes of complicated geometries, in which it may not be possible to remove the support layer by lifting it off of the lining layer. Such a support layer may be used in automated or manual applications.

As mentioned above, in some examples, the kits and methods described above may be used to prepare 3-dimensional cakes (i.e cakes that are generally not a flat sheet)

The kits described above may be sold for home use, or may be used commercially and/or industrially to make finished cakes on a large-scale. Furthermore, any of the steps described above may be automated. For example, in FIGS. 13A to 14B, the support mold may be moved downwardly by an automated system. Further, in examples where the support layer is of a multi-piece construction, the support layer may be assembled together by an automated system.

In any of the above examples, the lining layer may be of a variety of textures, which may be imparted to the finishing compound. For example, the lining layer may be smooth to impart a smooth finish to the finishing compound. Alternatively, the lining layer may be of a rough texture to impart a rough finish to the finishing compound.

Figure 15:
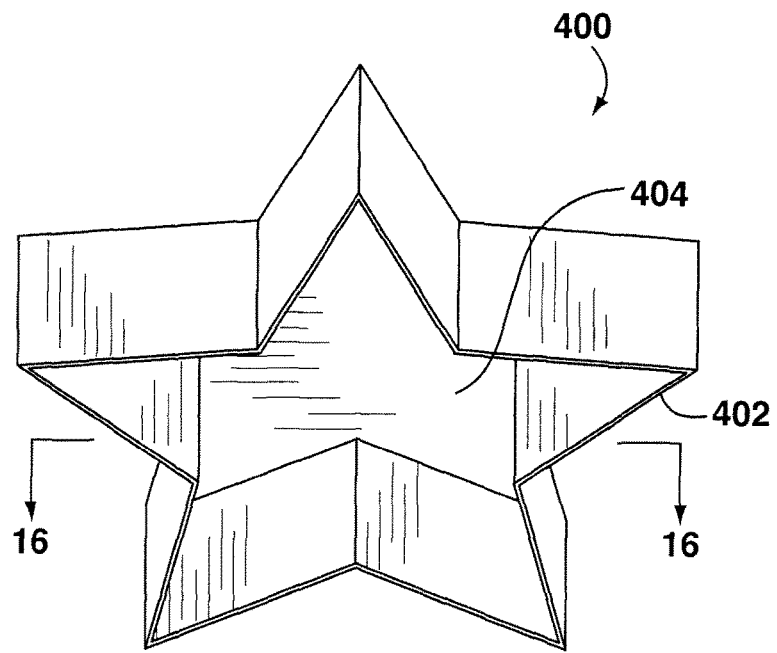
FIG. 15 is a perspective view of a core mold in accordance with another embodiment.

FIG. 15 shows a core mold 400 in accordance with at least one embodiment. In the example shown, core mold 400 can be use for forming and finishing a cake core to produce a finished cake. As used herein and in the claims, a "finished cake" is a cake core to which at least finishing compound is applied.

In at least one embodiment, the material composition of core mold 400 provides sufficient rigidity for core mold 400 to retain its shape when forming and finishing a cake core, and sufficient flexibility to allow the finished cake core to be easily removed from core mold 400. In one example, core mold 400 is made of a silicone material, such as a high-temperature, food grade, platinum set silicone having a shore rating of between 20 and 50. Optionally, core mold 400 is similar to lining layer 108 of finishing mold 104, with possibly thicker walls and/or made with a material having a higher shore rating for increased rigidity.

In the example shown, core mold 400 includes walls 402 which define a cavity 404. In at least one embodiment, cavity 404 can be at least partially filled with cake ingredients to form a cake core. Optionally, forming the cake core includes baking the cake ingredients inside of the core mold 400, e.g. using an oven.

Figure 16:
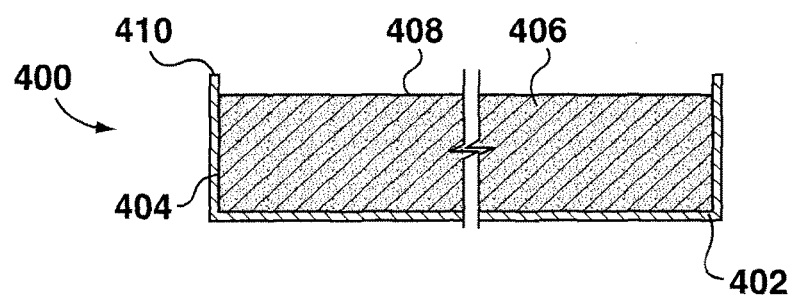
FIG. 16 is a cross-sectional view taken along line 16-16 in FIG. 15 after forming a cake core.

FIG. 16 shows a cross-sectional view of core mold 400 taken along line 16-16 in FIG. 15, after forming a cake core 406. In the example shown, cake core 406 has been formed to occupy less than the entire volume of cavity 404 of core mold 400. In some cases, forming cake core 406 may include trimming upper surface 408 to below the level of upper surface 410 of core mold 400. For example, some cake ingredients rise when baked which may cause upper surface 408 to rise to or even above the level of upper surface 410. In this example, the upper surface 408 can be trimmed using, e.g. a knife, to lower the upper surface 408 to below the level of upper surface 410. In at least one alternative embodiment, upper surface 408 of cake core 406 is trimmed, if necessary, only after it is removed from core mold 400.

After forming cake core 406, core mold 400 and cake core 406 can be separated. Optionally, cake core 406 is cooled or frozen to increase the structural integrity of cake core 406 before removing from core mold 400. For example, cake core 406 inside of core mold 400 can be cooled in a refrigerator or freezer for a few hours or overnight. In some cases, cake core 406 has sufficient structural integrity and core mold 400 has sufficient flexibility to permit cake core 406 to be removed without cooling or freezing cake core 406.

Figure 17:
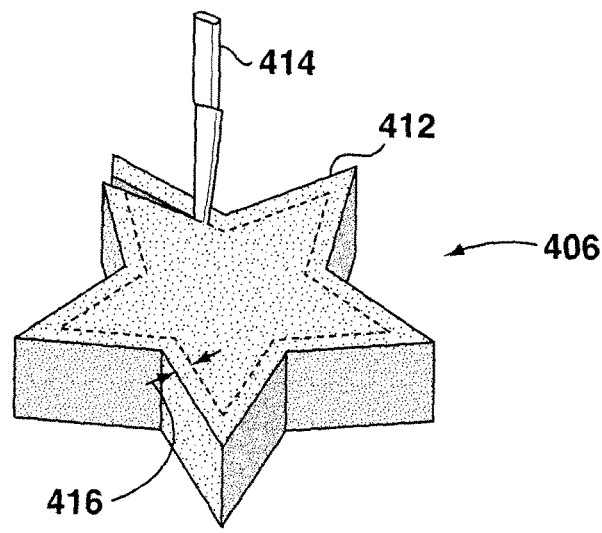
FIG. 17 is a perspective of trimming a perimeter of the cake core of FIG. 16.

In at least one embodiment, before or after removing cake core 406 from core mold 400, a thickness 416 about perimeter 412 of cake core 406 may be trimmed. FIG. 17 illustrates trimming a thickness 416 about perimeter 412 of cake core 406 using a knife 414. In the example shown, a uniform thickness 416 is trimmed from the perimeter 412 of cake core 406. Optionally, thickness 416 may be from about 0.125 inches to 2 inches, or from about 0.2 inches to 1 inch or from about 0.3 inches to 0.7 inches. In at least one embodiment, thickness 416 is not uniform and varies about perimeter 412 of cake core 406.

After removing cake core 406 from core mold 400, finishing compound 418 can be applied to core mold 400. Optionally, different finishing compound (e.g. differently colored finishing compound or finishing compound having a different taste or texture) can be applied to different interior surfaces of core mold 400. For example, core mold 400 may include an embossed design (e.g. a flower) onto which finishing compound may be decoratively applied (e.g. to make white petals and a green stem). In some cases, one or more of air brushed colors, colored finishing compound, and texture can be manually applied to the finished cake. In one example, substantially all of the finishing compound 418 applied to core mold 400 is one uniform color (e.g. white), and color (e.g. by air brushing and/or applying additional colored finishing compound) and/or texture is manually applied to the finished cake.

Figure 18:
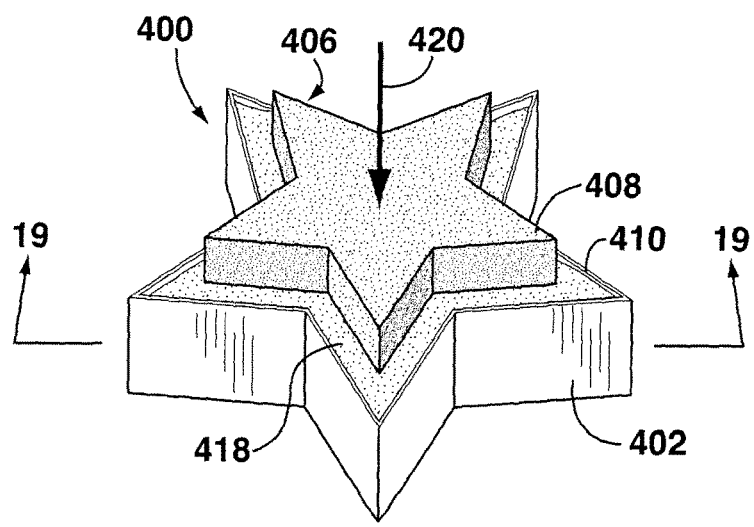
FIG. 18 is a perspective view of the cake core of FIG. 17 being inserted into the core mold of FIG. 15.

FIG. 18 shows cake core 406 being inserted into core mold 400 after trimming perimeter 412 of cake core 406 and after applying finishing compound 418 to core mold 400, in accordance with at least one embodiment. Cake core 406 is shown being inserted centered with respect to walls 402 of core mold 400. This may provide a layer of finishing compound 418 between cake core 406 and walls 402. Cake core 406 may be inserted into core mold 400 by an application of force in the direction of arrow 420. Optionally, cake core 406 is pressed into core mold 400 until upper surface 408 is at or below the level of upper surface 410 of core mold 400. In some cases, excess finishing compound is squeezed out of core mold 400 when cake core 406 is inserted. The excess finishing compound can be removed.

Figure 19:
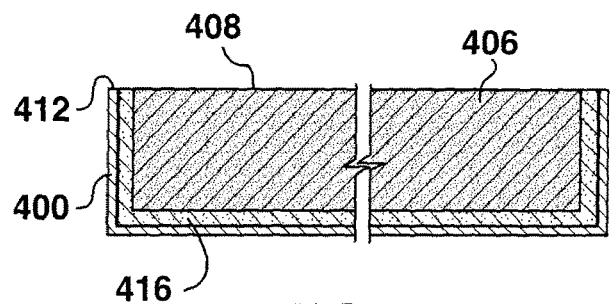
FIG. 19 is a cross-sectional view taken along line 19-19 in FIG. 18 after inserting the cake core.

FIG. 19 shows a cross-sectional view taken along line 19-19 in FIG. 18 after cake core 406 has been fully inserted into core mold 400, in accordance with at least one embodiment. As shown, the material composition and thickness of walls 402 of core mold 400 permit cake core 406 to be inserted without walls 402 deforming or bulging by the interaction of cake core 406 with finishing compound 418. In the example shown, upper surface 408 of cake core 406 is level with upper surface 410 of core mold 400. As shown, cake core 406 is centered in core mold 400 such that a layer of finishing compound 418 fills the void between cake core 406 and walls 402 of core mold 400.

Figure 20:
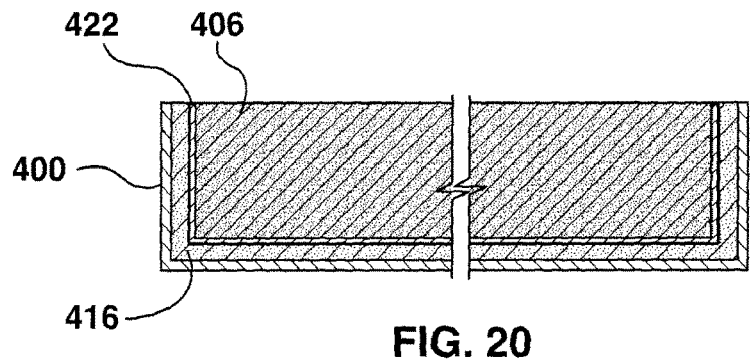
FIG. 20 is a cross-sectional view taken along line 19-19 in FIG. 18 after inserting the cake core and including a transitional layer.

FIG. 20 shows a cross-sectional view taken along line 19-19 in FIG. 18, in accordance with another embodiment. In the example shown, a transitional layer 422 of finishing compound is applied between cake core 406 and finishing compound 418. In some cases, transitional layer 422 may improve adhesion between cake core 406 and finishing compound 418. In at least one embodiment, transitional layer 422 includes substantially the same type of finishing compound as finishing compound 418. In at least one alternate embodiment, transitional layer 422 includes at least some finishing compound that is substantially a different type of finishing compound than finishing compound 418.

In one example, transitional layer 422 is applied by squeezing finishing compound through a nozzle filling gaps between cake core 406 and finishing compound 418 which remain after cake core 406 is inserted into core mold 400. In another example, transitional layer 422 is applied by applying a layer of finishing compound on top of finishing compound 418, and subsequently inserting cake core 406 into core mold 400. In another example, transitional layer 422 is applied by applying a layer of finishing compound directly to cake core 406 (before or after cooling, if applicable), and subsequently inserting cake core 406 into core mold 400. In at least one embodiment, transitional layer 422 is applied according to more than one of the above examples.

In at least one embodiment, perimeter 412 of cake core 406 is not trimmed before reinserting cake core 406 into a finished core mold 400. In one example, cake core 406 shrinks when prepared (e.g. baked) inside of core mold 400. For example, some cake ingredients (e.g. cake ingredients having high moisture content) shrink when baked.

Figure 21:
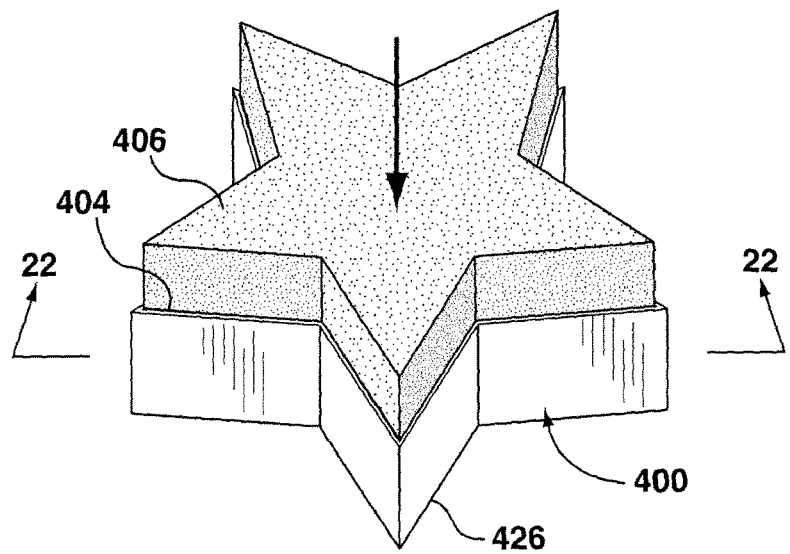
FIG. 21 is a perspective view of the cake core of FIG. 16 being inserted into the core mold of FIG. 15.

FIG. 21 shows another example, in which a cake core 406, having substantially the full profile of cavity 404 of core mold 400, is being reinserted into a finished core mold 400. In this example, applying finishing compound 418 to core mold 400 may be limited to applying finishing compound 418 to the lower wall 426 of core mold 400.

Figure 22:
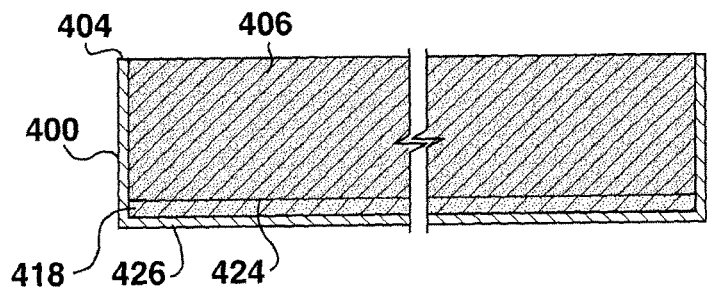
FIG. 22 is a cross-sectional view taken along line 22-22 in FIG. 21.

FIG. 22 shows a cross-sectional view taken along line 22-22 in FIG. 21 after cake core 406 is inserted into core mold 400. In the example shown, cake core 406 occupies substantially the entire width of cavity 404. Finishing compound 418, as shown, is substantially limited to a layer between a lower surface 424 of cake core 406 and a lower wall 426 of core mold 400.

After cake core 406 has been inserted into core mold 400 (e.g. in any of the above examples), core mold 400 containing at least cake core 406 and finishing compound 418 may be cooled or frozen to harden cake core 406 and finishing compound 418. This may increase the structural integrity of cake core 406 and finishing compound 418 to help with subsequently removing core mold 400 without damaging cake core 406 and finishing compound 418. In some cases, cake core 406 and finishing compound 418 have sufficient structural rigidity and core mold 400 has sufficient flexibility to permit core mold 400 to be removed without damaging cake core 406 and finishing compound 418.

Figure 23:
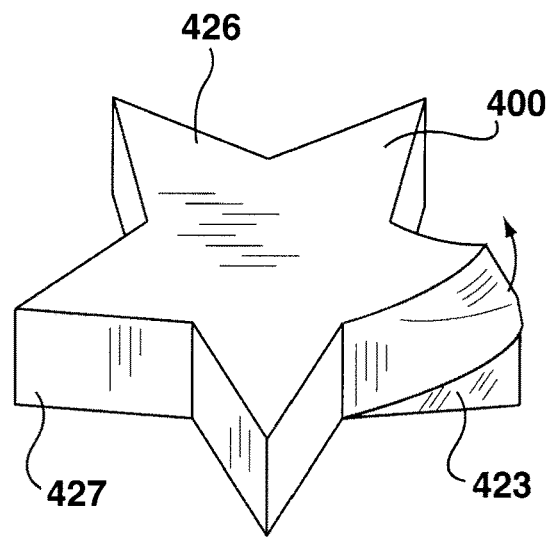
FIG. 23 is a perspective view of removing a core mold from a finished cake.

FIG. 23 illustrates removing core mold 400 from finished cake 428 (a combination of at least cake core 406 and finishing compound 418). As shown, the selected material composition (e.g. silicone as described above) and thickness of core mold 400 permit core mold 400 to be flexibly peeled off of the finished cake 428. In an alternative embodiment (not shown), core mold 400 includes rigid sidewalls 427 (e.g. made of plastic, nylon, metal or rigid silicone) and a flexible lower wall 426 (e.g. made of flexible silicone). In this case, core mold 400 can be removed from finished cake 428 by applying a force to lower wall 426 to deform lower wall 426 inwardly and push finished cake 428 out of core mold 400.

Figure 24:
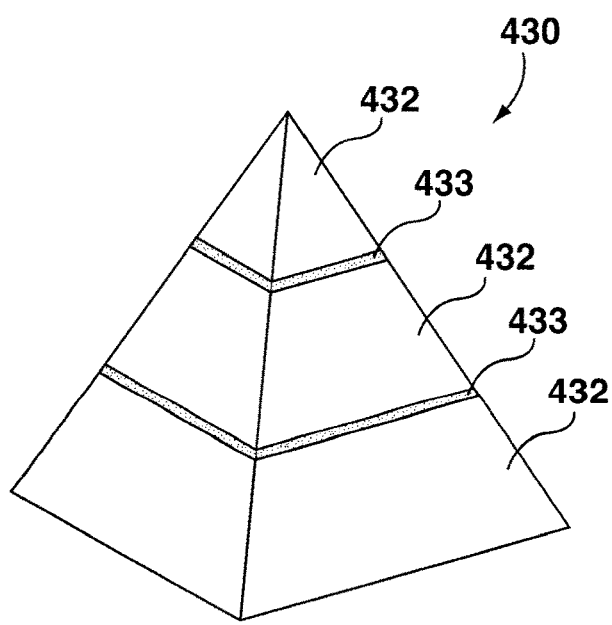
FIG. 24 is a perspective view of a layered cake.

In at least one embodiment, a large cake (e.g. having a height greater than 6 inches) or a cake having a complex shape (e.g. having undercuts) is prepared as a layered cake by stacking or otherwise combining a plurality of cake layers made according to any one or more of the embodiments described herein. For example, FIG. 24 shows a layered cake 430 include three stacked cakes layers 432. In the example shown, each finished cake layer 432 has a different size and shape, and was made using a different mold or molds (e.g. according to one of the embodiments described herein).

In some cases, a layered cake 430 is prepared by stacking a plurality of layers 432 of finished cakes (e.g. made according to one or more of the embodiments described herein). Optionally, finishing compound is applied to an exterior of the layered cake 430 to hide the seams between the layers 432. In some cases, a layered cake 430 is prepared by stacking a plurality of layers 432 of cake cores (e.g. made according to one or more of the embodiments described herein). Optionally, finishing compound 433 is applied between layers 432 to hold the layers 432 together.

Figure 25:
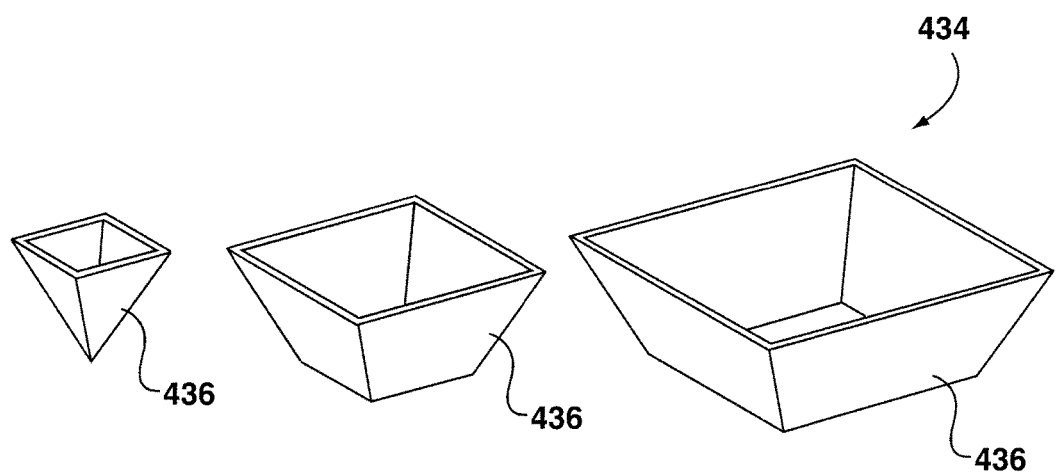
FIG. 25 is a perspective view of a kit for preparing a layered cake.

In at least one embodiment, a layered cake kit includes a plurality of kits for forming the plurality of layers of cores and/or finished cakes. FIG. 25 shows one example of a layered cake kit 434 including a plurality of different core molds 436. Core molds 436 can be used to prepare cake cores (or finished cakes) for the layers 432 of layered cake 430. In some embodiments, layered cake kit 434 also includes a corresponding finishing mold (not shown) for each core mold 436 for preparing finished cake for layers 432.

As mentioned above, various finishing compounds may be used in the above kits and methods. The finishing compounds may optionally include a setting or firming agent, such as gelatin or cocoa butter. In some examples, a standard icing may be used, which may include approximately 65 wt % to 75 wt % icing sugar, 25 wt % to 30 w. % shortening or fat, and 0 wt % to 10 wt % water. In other examples, a liquid icing may be used, which may include 60 wt % to 65 wt % icing sugar, 23 wt % to 28 wt % shortening or fat, 5 wt % to 10 wt % water, and 0.5 wt % to 2.5 wt % gelatin. The liquid icing may optionally be warmed when it is applied to the finishing layer, so that it is generally quite fluid, and then cooled after applied to the finishing layer, so that it hardens. In other examples, a putty icing may be used (mentioned above), which may include 75 wt % to 80 wt % icing sugar, 18 wt % to 23 wt % shortening or fat, and 0 wt % to 3 wt % water. The putty icing may further optionally include a setting/firming agent. In other examples, a high slump icing may be used, which may include a fat that is quite firm at room temperature a medium ratio of sugar, and optionally a setting/firming agent such as gelatin.

In at least one embodiment, a kit (e.g. kit 100) for preparing a cake may include one or more chocolate molds. The chocolate molds may be used to form solid or hollow chocolate shapes. In some cases, the molded chocolate shapes may be used in conjunction with a cake core or finished cake. For example, molded chocolate shapes may be placed inside areas of a cake core or finished cake to provide structural support where needed.

In some cases, a hollow chocolate shape may be hidden inside a cake to provide a hollow cake a having reduced density and improved structural integrity (e.g. as compared with a cross-section of solid cake). This may permit a cake to have impressively large outside dimensions, and yet a low weight and smaller net volume for feeding fewer people.

In at least one embodiment, a hollow chocolate shape incorporated into a cake may be filled with one or more of cake, candies, chocolates, toys, and gifts for example.

While the above description provides examples of one or more processes or apparatuses, it will be appreciated that other processes or apparatuses may be within the scope of the accompanying claims.

The invention claimed is:

1. A method for preparing a finished cake product, comprising:
   a) inserting a cake core having a top surface and a base surface into a finishing mold through an opening of the finishing mold so that a void is created between the top surface of the cake core and the finishing mold;
   b) after a), sealing the opening of the finishing mold;
   c) after b), applying a liquid finishing compound to the void between the top surface of the cake core and the finishing mold so that the finishing mold defines a contour of a top surface of the finished cake product;
   d) after c), hardening the liquid finishing compound; and
   e) removing the finishing mold from the cake core and finishing compound.

2. The method of claim 1, wherein step c) comprises injecting the finishing compound through at least one injection port of the finishing mold.

3. The method of claim 1, further comprising applying a force to the finishing mold to move the finishing compound within the finishing mold.

4. The method of claim 1, further comprising baking the first cake core to occupy between 50% to 75% of a volume of the finishing mold.

5. The method of claim 1, further comprising:
   using a second core mold to prepare a second cake core; and combining the first and second cake cores.

6. The method of claim 5, further comprising applying a finishing compound to hold the combined first and second cake cores together.

7. The method of claim 1, comprising in step a) placing the finishing mold over the cake core.

8. The method of claim 1, comprising hardening the liquid finishing compound by cooling.

9. The method of claim 1, wherein the cake core further comprises a side surface and the finishing mold defines a contour of a side surface of the finished cake product.

* * * * *